United States Patent [19]

Christen

[11] Patent Number: 5,244,132
[45] Date of Patent: Sep. 14, 1993

[54] GARMENT BAG AND SUPPORT RACK THEREFOR FOR USE WITH BICYCLE

[76] Inventor: Lisa Christen, 2415 Medicine Lake, Dr. West, Plymouth, Minn. 55441

[21] Appl. No.: 711,302

[22] Filed: Jun. 6, 1991

[51] Int. Cl.⁵ .............................................. B62J 9/00
[52] U.S. Cl. .................................. 224/32 A; 224/39; 224/901; 206/287.1; 383/11
[58] Field of Search .................... 224/32 A, 32 R, 39, 224/901; 383/11; 206/287.1

[56] References Cited

U.S. PATENT DOCUMENTS

| | | | |
|---|---|---|---|
| 1,260,937 | 3/1918 | Muller, Jr. | |
| 3,937,374 | 2/1976 | Hine, Jr. | 224/32 A |
| 4,261,491 | 4/1981 | Schroeder | 383/11 |
| 4,301,952 | 11/1981 | McNeill | 224/32 A |
| 4,345,703 | 8/1982 | Allen | 224/32 A |
| 4,562,944 | 1/1986 | Jackson et al. | 224/32 A |
| 4,580,706 | 4/1986 | Jackson et al. | 224/32 A |
| 4,598,803 | 7/1986 | Ghiassi | 206/287.1 |
| 4,666,071 | 5/1987 | Irwin et al. | 224/32 A |
| 4,869,408 | 9/1989 | Lutz | 224/32 A |

OTHER PUBLICATIONS

"California Bicyclist", p. 7, Southern Edition Jun. 1991, advertisement for Eccosport Garment Bag, and related promotional material.

Primary Examiner—Linda J. Sholl
Attorney, Agent, or Firm—Haugen and Nikolai

[57] ABSTRACT

A garment bag and support rack therefore adopted for use on the rear portion of a bicycle, with the support rack and garment bag containing securing means to insure that the garment bag remains stable while being transported by the bicyclist.

7 Claims, 5 Drawing Sheets

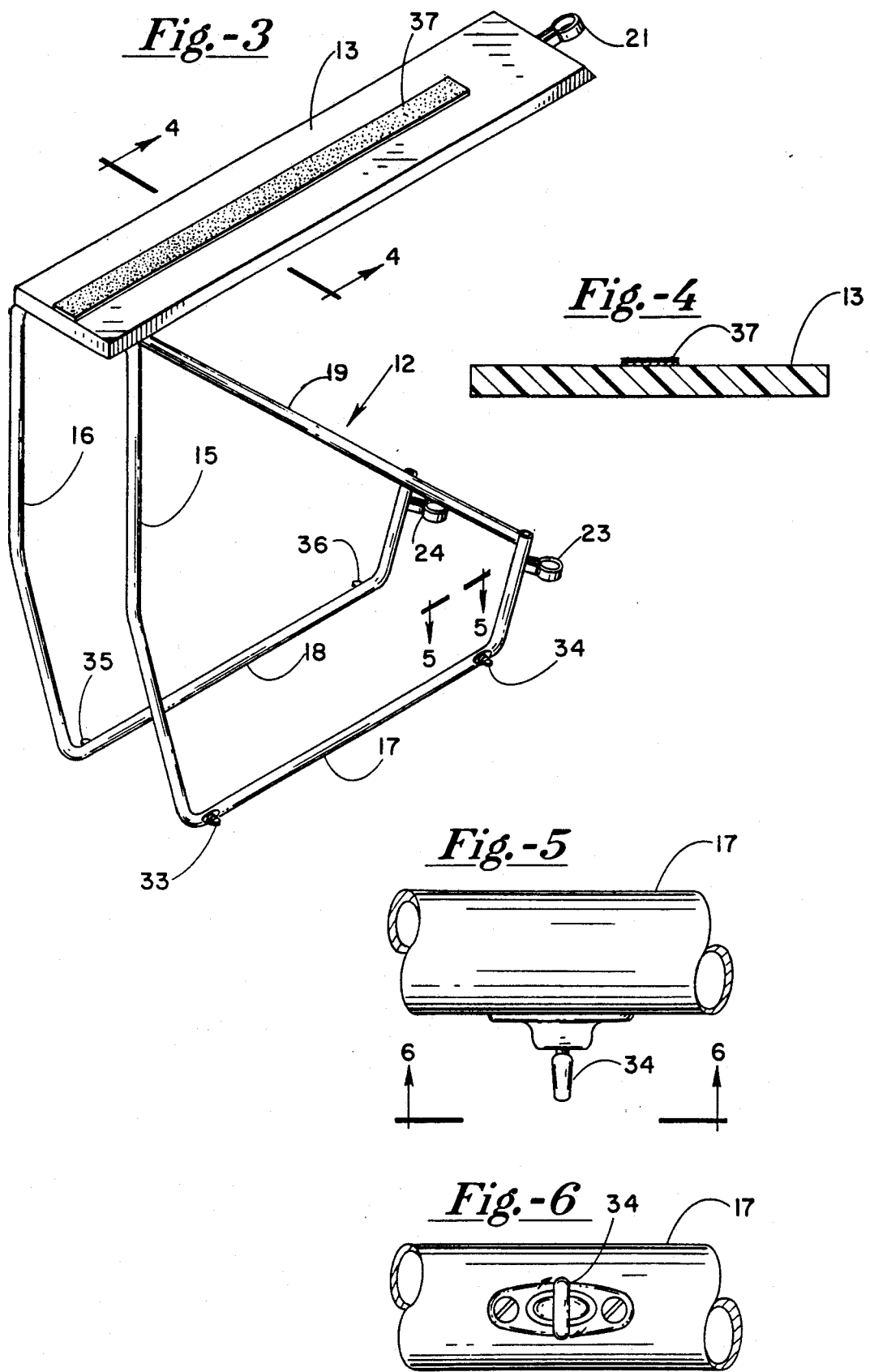

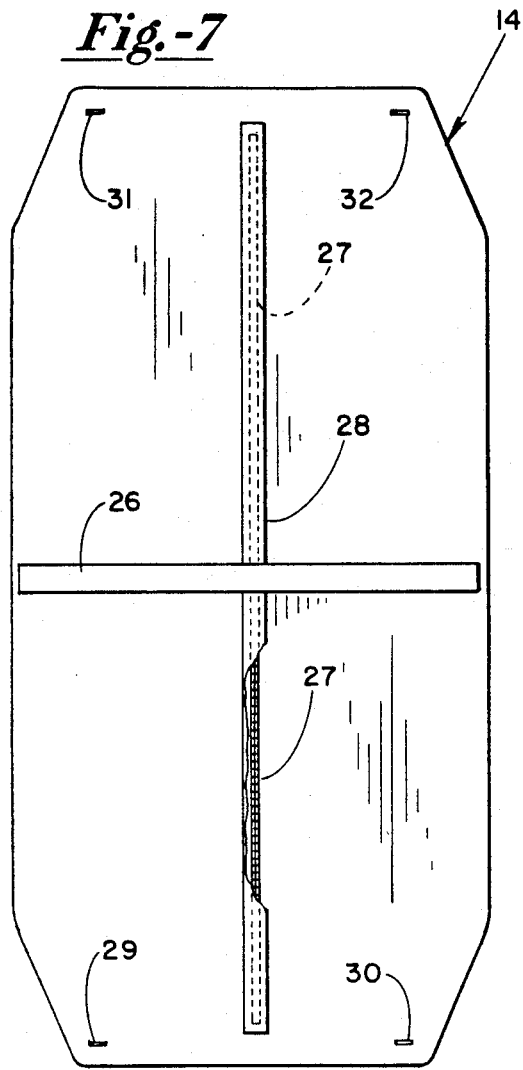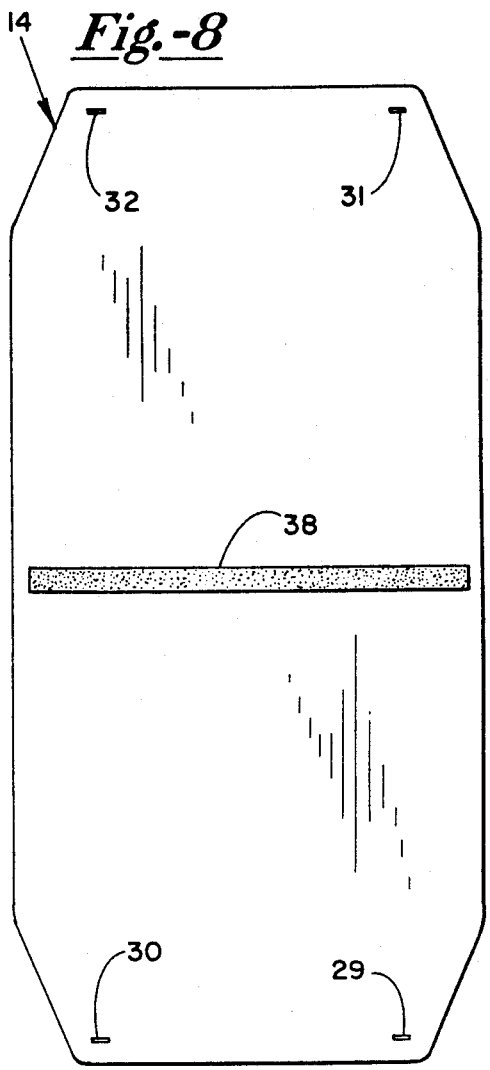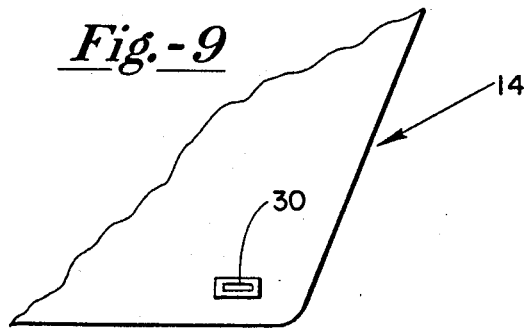

GARMENT BAG AND SUPPORT RACK THEREFOR FOR USE WITH BICYCLE

BACKGROUND OF THE INVENTION

This invention relates to a bicycle rack/garment bag combination, and more specifically to a bicycle rack/garment bag which may be used by women and men bicyclists who wish to bike to and from work and to transport fresh dress clothes to and from work in an easy and efficient fashion.

SUMMARY OF THE INVENTION

The 1980's and 1990's have witnessed two seemingly distinct cultural trends: the advent of society-wide environmental consciousness, and the advent of physical fitness as an important part of many person's lives. Bicycling is a common link between these two trends in that the idea of bicycling is attractive to both the environmentally conscious and to the fitness buff. Furthermore, for a variety of other well known reasons, bicycling has traditionally been a popular leisure time activity. Additionally, bicycling has for time immemorable served as a mode of transportation to and from one's place of employment, particularly if the bicyclist is employed in a field where he or she may wear clothing conducive to bicycling, such as, for example, clothing made specifically for bicyclists, or shorts or blue jeans with a casual shirt. On the other hand, however, many enthusiasts are employed in occupations which require a more formal attire. During the work week, these individuals are generally expected to wear, in the case of women, a blouse, tie, suit coat, and skirt, and in the case of men, a dress shirt, tie, and suit. Such clothing is not conducive to biking, or for that matter any sort of physically enduring activity. These individuals find themselves forced to choose between the prospect of soiled and potentially ripped garments should they bike to work, and the prospect of not biking to work at all, in spite of a desire to do so. In order to eliminate this paradox, what is needed is a device which will allow biking enthusiasts who are employed in fields requiring dress clothes the opportunity to bike to work in garments traditionally worn while bicycling, while simultaneously allowing such a person to transport his or her formal work attire in a safe, clean, and efficient manner. What is needed, in other words, is an improved garment carrying bag/bike rack combination.

Bicycle racks, attachable to the rear portion of a bicycle, are prevalent in the prior art. For example, U.S. Pat. No. 1,260,937, issued to Muller in 1918 reveals "improvements in that class of inventions known as package and article carriers and more particularly relates to a carrier attachment for a bicycle or motorcycle". Over time, developments in the art have resulted in improvements and specializations in the area of bicycle racks, and devices incorporated into such racks for carrying purposes. For example U.S. Pat. No. 4,301,952, issued to McNeill in 1981 discloses a rack and carrying bag "particularly suited for carrying books and similar articles used by students and the like".

One piece of prior art exists which reveals a garment bag specifically modeled for use in connection with bicycles, U.S. Pat. No. 4,869,408, issued to Lutz in 1989. This patent, however, contains certain limitations. For example, the '408 garment bag is designed in such a way that garments must be folded along the spine resulting in wrinkles. Further, the device will not properly support the skirt of a woman's suit, which is typically hung off at the hanger itself via pin mechanisms. Women employed in fields which require formal attire are generally required or expected to wear such a skirt or dress at the place of employment.

It is thus a main object of this invention to provide a means for fitness and/or environmentally conscious men and women, and men and women biking enthusiasts in general, to be able to bicycle to work, even if such people are employed in fields requiring dress clothing or other clothing not conducive to bicycling.

It is a further object of the present invention to improve upon previous devices in the relevant field by providing a bike rack/garment bag combination which may efficiently and effectively be used by either women or men.

It is a further object of this invention to provide a light weight, durable, water and element resistant garment bag which may be firmly and securely attached to the bike rack in an efficient fashion, and which likewise may be removed from the bike rack in an efficient fashion.

It is a further object of this invention to provide a combination bicycle rack/garment bag which may be used by either men or women, and which will insure that these dress clothes will receive the same convenience, efficiency and quality transportation as in a standard garment bag.

It is a further object of this invention to provide a garment bag which is light weight and durable, and suitable for general and intended uses by men and women.

BRIEF DESCRIPTION OF THE DRAWINGS

FIG. 3 is a perspective view of the support rack portion of the present invention with the garment bag being removed;

FIG. 4 is a cross-sectional view, taken along line and in the direction of the arrows 4—4 at slightly enlarged scale of the rigid elongated member of the support rack portion of the present invention;

FIG. 5 is an elevation view of that area of the support rack portion of the present invention containing a bayonet pin member;

FIG. 6 is a cross-sectional view taken along line 6—6 of that area of the support rack portion of the present invention containing a bayonet pin member;

FIG. 7 is a top plan view of the garment bag portion of the present invention lying in flat unfolded disposition and depicting the zipper, zipper cover, and strap portion of the garment bag portion of the present invention;

FIG. 8 is a bottom plan view of the garment bag portion of the present invention as shown in FIG. 7 and depicting the hook and loop portion of the garment bag;

FIG. 9 is a detail elevational view of one corner segment of the securing means of the garment bag portion of the present invention.

DESCRIPTION OF THE PREFERRED EMBODIMENT

Figure 1:
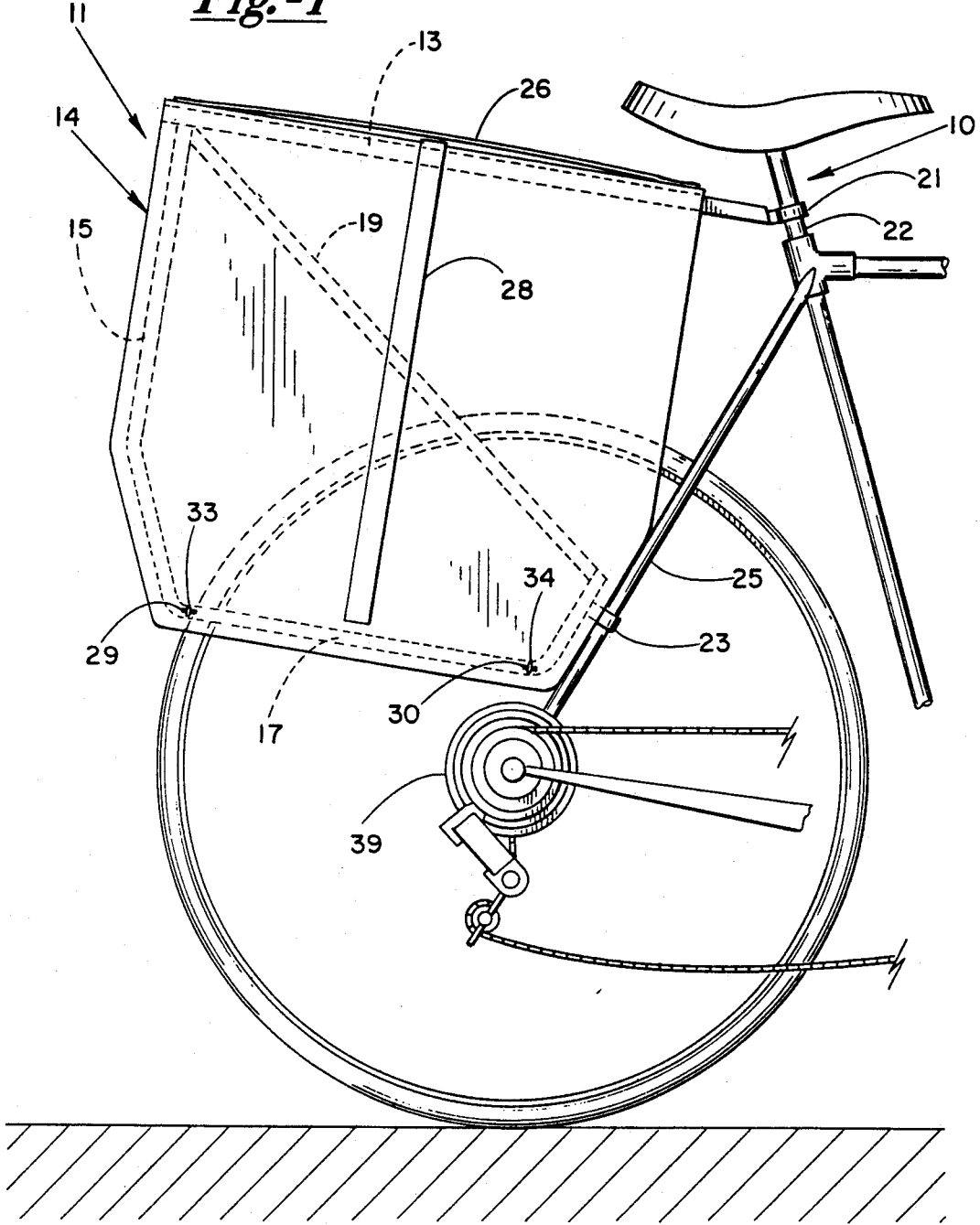
FIG. 1 is a side elevational view of the rear portion of a bicycle, showing the garment bag and support rack of the present invention, in place on the bicycle, with the forward portion being broken away.

Referring more particularly to the drawings, FIG. 1 is a depiction of the preferred embodiment of the support rack/garment bag portion 11 of the present invention, installed on a conventional bicycle 10. The support rack 12 portion of the present device is removably attached to bicycle 10 via mounting means 21 and 23, with these mounting means being comprised of, for example, straps or bands affixed to, respectively, seat post 22 and rear fork 25. Not depicted in FIG. 1 is fastener 24, also comprised of, for example, a strap or band, and located on the opposite side of the bicycle 10. Mounting means 24 affixes to frame post 25A. Bicycle rack 12 also contains elongated rigid garment bag receiving pad member 13 upon which the garment bag portion 14 of the present invention is draped and affixed via, for example, either the hook or loop portion of a hook and loop fastening system. Support for the garment bag receiving pad member 13 is provided by laterally disposed members 15 and 16, and laterally disposed members 17 and 18. Added support and stability for the support rack portion of the present invention are provided by two cross-bar support members, with one such member 19 being depicted in FIG. 1.

The garment bag portion 14 of the present invention is comprised of a light, durable, weather resistant material, such as, for example, nylon. Garment bag 14 is of a standard size which will allow conventional men's or women's suits and women's dresses to efficiently fit within it. Contained on one side of the garment bag is a support panel segment comprised of, for example, either the hook or loop portion of a hook and loop fastening system, said hook and loop fastening system employed to securely fasten the garment bag to the rigid elongated member 13. The garment bag portion 14 of the preferred embodiment of the present invention also contains a closure means such as, for example, a zipper which is protected from rain and other elements by protective flap 27. The garment bag portion 14 is further secured to the rack portion 12 of the present invention by a securing means consisting of, for example, an eyelet/bayonet system as shown at 29-30 and 33-34. Not depicted in FIG. 1 is an identical eyelet/bayonet pin system located on the opposite side of the bicycle as shown, and workable in an identical manner.

Securing the garment bag 14, as shown, insures that the garment bag 14 will not flap or otherwise react to wind, or interfere with the spokes when the garment bag 14 is in use with the bicycle 10.

In the preferred embodiment, the support rack portion 12 of the present invention is affixed to the bicycle 10 in such a manner that the garment bag receiving pad member 13 slopes at an angle to ensure that the front leading edge of the garment bag 14 is at all times behind the rear forks 25 and 25A of the bicycle 10, ensuring non-interference with the normal pedaling action of the bicycle 10.

The bicycle rack portion 12 of the present invention is designed in such a way that the lower support segments 17 and 18 of the rack may extend to a point below the upper most point of hub assembly 39. In such a case, when the garment bag 14 of the present invention is attached to the bicycle rack 12 it will drape below the hub assembly 39, but avoid interfering with the hub assembly because of the outward disposition of lower support portions 17 and 18.

Figure 2:
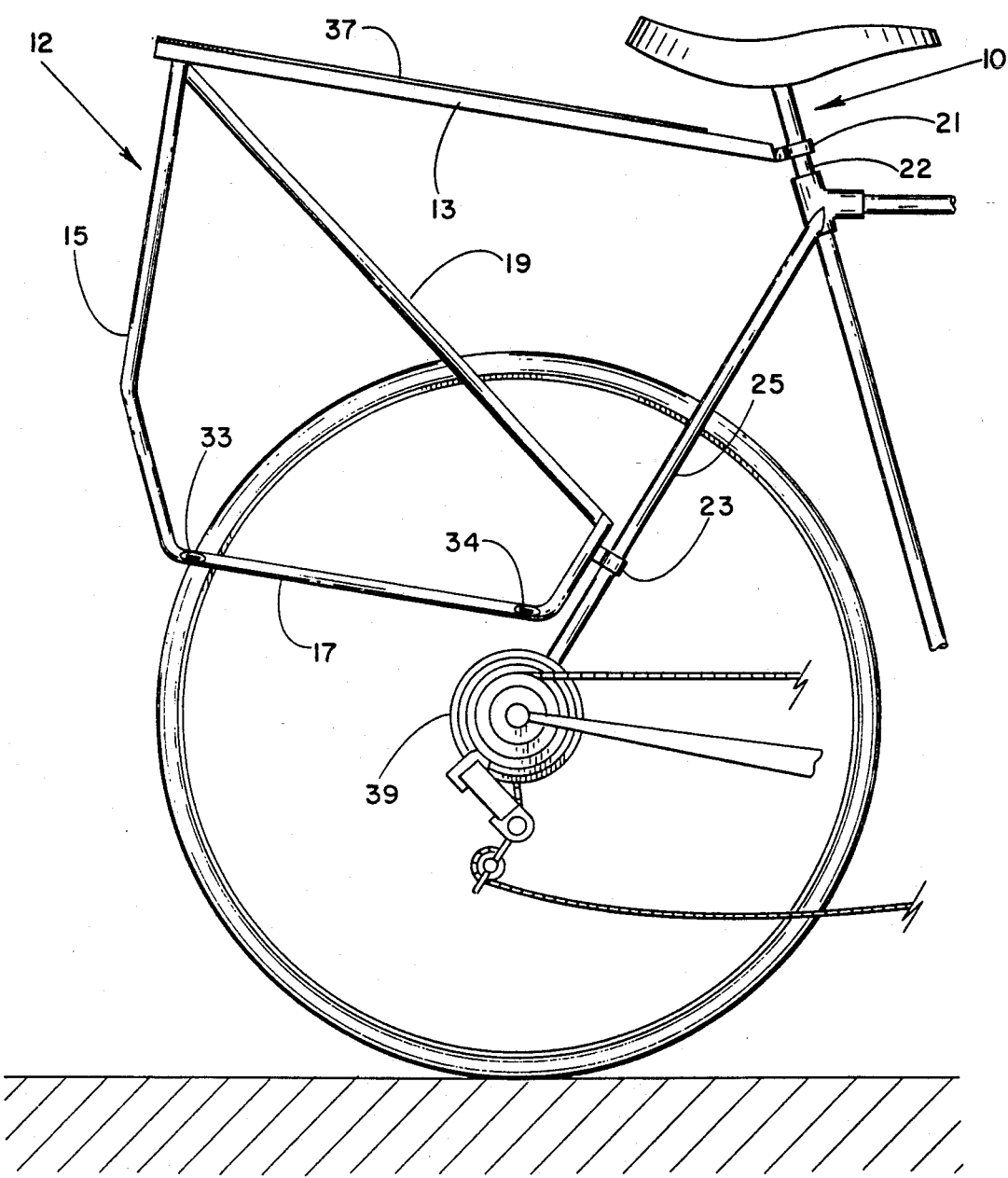
FIG. 2 is a side elevational view of the rear portion of a bicycle, showing the support rack portion of the present invention in place on the bicycle, with the forward portion being broken away.

The support rack portion 12 of the present invention is depicted in FIG. 2. Of particular note is the hook or loop portion of the hook and loop fastening system 37, located on top of garment bag receiving pad member 13, and acting as a support panel.

Attention is directed to FIG. 3 wherein the entire support rack 12 of the present invention is shown, including lateral member 16 and lateral member 18.

Garment bag receiving pad member 13 is depicted in FIG. 4, along with the hook or loop portion of the hook and loop fastening system 37, as affixed to the elongated rigid member. The hook or loop portion 37 of the hook and loop fastening system is affixed to the garment bag receiving pad member 13 in a known fashion such as, for example, with glue or any other adhesive compound.

FIG. 5 depicts one of the four securing means, depicted in the preferred embodiment as rotatable bayonet pins 33 incorporated into the present invention, and used to secure the garment bag 14 to the bicycle rack 12. The garment bag 14 contains four eyelet holes, each of which receives one of the four pins.

FIG. 6 similarly depicts one of the rotatable bayonet pins 33 of the preferred embodiment.

The garment bag portion 14 of the present invention, as shown in FIGS. 7-9, consists of a generally thin, light weight, durable shell constructed of, for example, nylon. As shown in FIG. 7 the garment bag 14 contains a carrying strap 26 for easy and efficient transportation of the garment bag once the biking journey is complete. FIG. 7 also depicts the zipper portion 27 of the garment bag, with the zipper 27 being protected from the elements via the use of a closable flap 28 which fits over and protects the zipper 27. The closable flap 28 is, when in its closed position, secured to the bag via a fastening system such as, for example, a hook and loop fastening system. FIG. 8 depicts the opposite side of the garment bag 14, and displays the elongated releasable retention means 38 employed to assist in securing the garment bag 14 to the garment bag receiving pad member 13, with this releasable retention means consisting of, for example, the hook or loop portion of a hook and loop fastening system. As shown in FIG. 9, eyelets 29-32 are employed in order to assist in the securing of the garment bag 14 to the bicycle rack 12. Four such eyelets are present, with each eyelet 29-32 corresponding to a bayonet pin 33-36.

Figure 10:
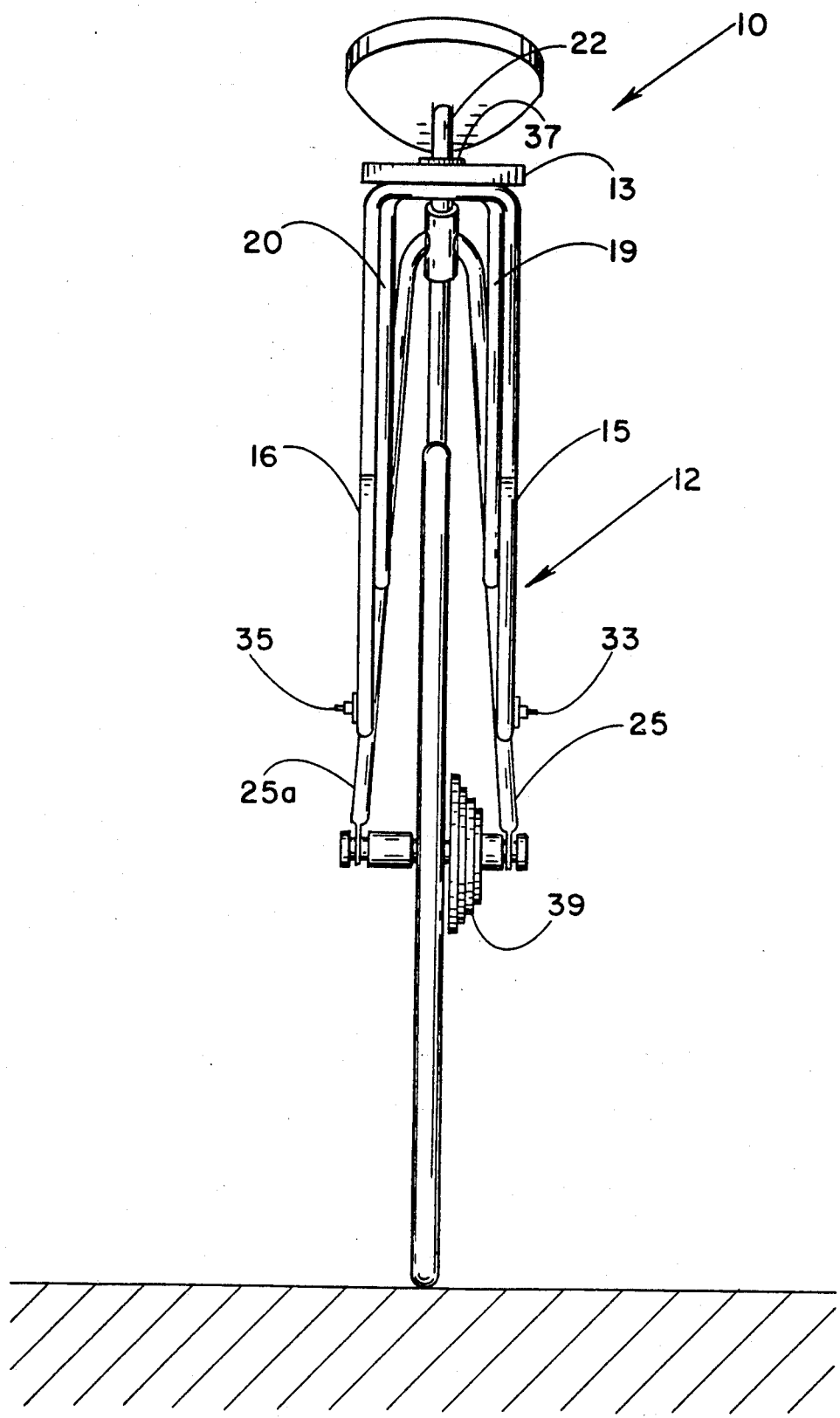
FIG. 10 is a rear perspective view of a bicycle, showing the support rack portion of the present invention in place on the bicycle, with the garment bag being removed.

As shown in FIG. 10, the support rack portion 12 of the present invention is constructed of a width which will allow the garment bag portion of the invention 14 to be draped over the bicycle rack portion 12 in a manner which insures that the garment bag 14 will not interfere with the normal workings of the bicycle 10, and in particular the rear wheel and hub 39 areas of the bicycle.

What is claimed is:

1. In combination, a garment bag and a support rack adapted to be secured to the rear portion of a bicycle; said garment bag and support rack being characterized in that:

(a) said support rack comprises an elongated rigid garment bag receiving pad member having a pair of laterally disposed support struts secured thereto, said struts each extending to a pair of corners at a lower distal end thereby providing the support rack with four corners, said support rack further characterized as containing:
  (1) a base mounting means at the lower distal ends of said struts for securing said support rack to the seat of a bicycle; and
  (2) a forward mounting means secured to said garment bag receiving pad member for securing said support rack to the seat post of a bicycle; and
  (3) a first securing means used to secure said garment bag to said support rack, said first securing means being generally located at each of the four corners of the lower distal ends of said struts; and
(b) said garment bag being further characterized in that:
  (1) said garment bag is comprised of a single open compartment; and
  (2) said garment bag contains second securing means generally located at the four corners of said garment bag, said second securing means used to secure said garment bag to said first securing means of said support rack; and
  (3) said garment bag contains a closure means for permitting access to the interior of said garment bag.

2. The garment bag and support rack described in claim 1, wherein said base mounting means for said struts consist of a fork means for coupling engagement to the rear hub of said bicycle.

3. The garment bag and support rack therefor described in claim 1, wherein said base mounting means for said struts consist of a means for coupling engagement to braze-on lugs.

4. The garment bag and support rack therefor described in claim 1, wherein the forward mounting means secured to said garment bag receiving pad member consists of a mounting means for coupling engagement to braze-on lugs.

5. The garment bag and support rack therefor described in claim 2, wherein the forward mounting means secured to said garment bag receiving pad member consists of a mounting means for coupling engagement to braze-on lugs.

6. The garment bag and support rack therefor described in claim 3 wherein the forward mounting means secured to said garment bag receiving pad member consists of a mounting means for coupling engagement to braze-on lugs.

7. The garment bag and support rack described in claims 1, 2, 3, 4, 5, or 6 wherein said support rack further comprises a first garment bag attachment means along the top of said garment bag receiving pad member for securing to said garment bag, and wherein said garment bag contains an exterior medially disposed second attachment means for releasably coupling said garment bag to said first attachment means of said garment bag receiving pad member.

* * * * *